J. F. KYTLICA.
PACKING RING.
APPLICATION FILED OCT. 21, 1918.
1,334,764.
Patented Mar. 23, 1920.
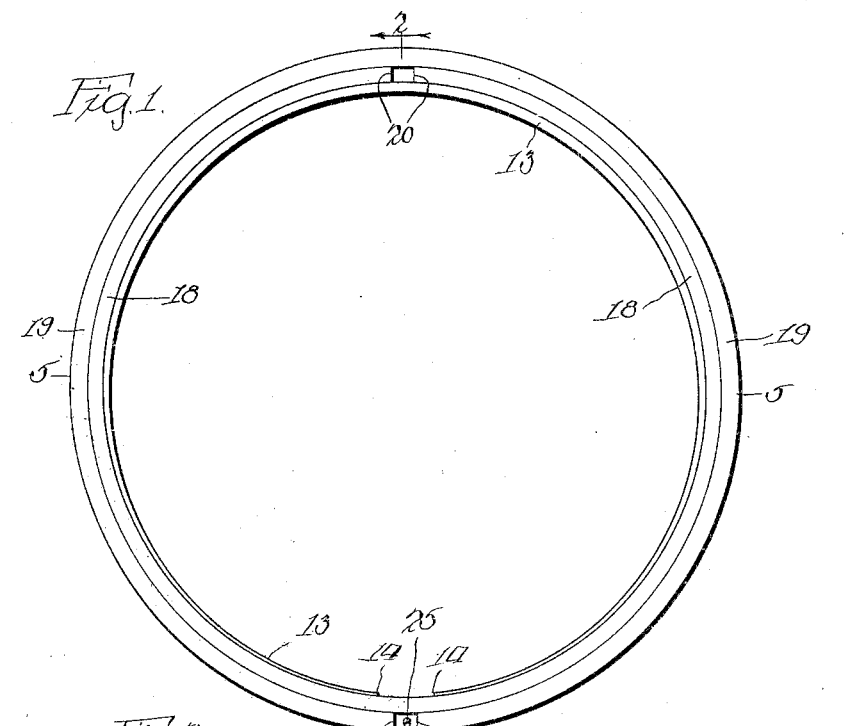
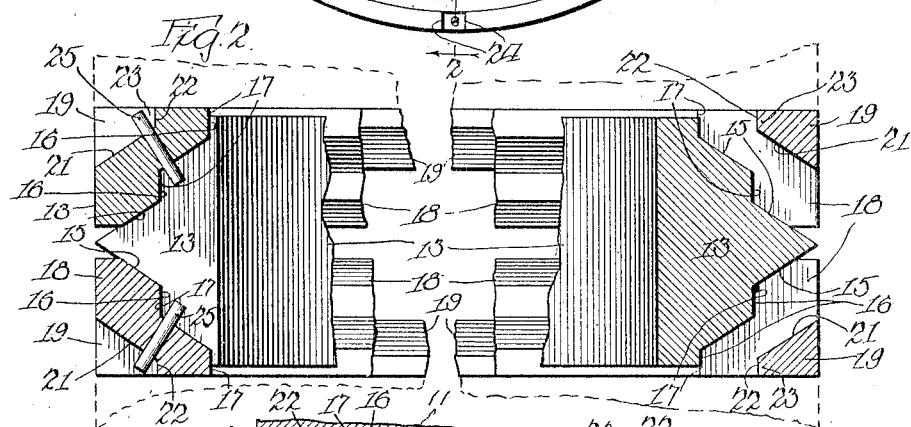
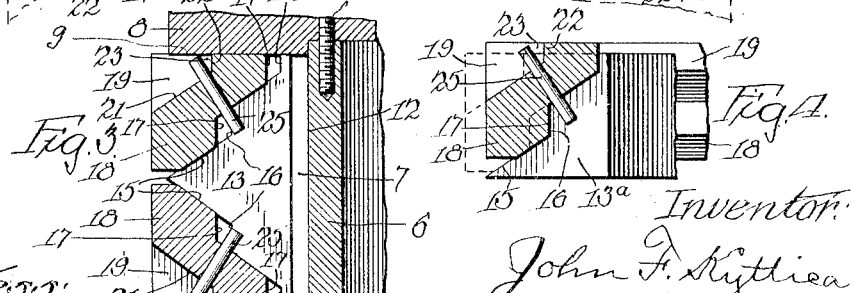
Inventor:
John F. Kytlica
By Chas. Tillman
Atty

UNITED STATES PATENT OFFICE.

JOHN F. KYTLICA, OF CHICAGO, ILLINOIS.

PACKING-RING.

1,334,764.   Specification of Letters Patent.   Patented Mar. 23, 1920.

Application filed October 21, 1918. Serial No. 259,067.

*To all whom it may concern:*

Be it known that I, JOHN F. KYTLICA, a citizen of the United States, and a resident of Chicago, in the county of Cook and State of Illinois, have invented certain new and useful Improvements in Packing-Rings, of which the following is a specification.

This invention relates to improvements in packing rings of the composite type employed in connection with reciprocating pistons in the cylinders of engines or motors, and while it is more particularly intended for use in connection with the pistons of steam and internal combustion engines, yet, it is applicable for use on the pistons of compressors or engines in which any kind of elastic fluid is used as a motive agent, and it consists in certain peculiarities of the construction, novel arrangement and operation of the various parts thereof as will be hereinafter more fully set forth and specifically claimed.

The objects of the invention are to furnish a packing ring of such construction, arrangement and operation of its parts that when the ring is seated or mounted on the piston and within the cylinder a substantially hermetic joint will be formed, thereby effectually avoiding leakage between the piston and cylinder; to provide a self adjusting form of ring, and one in which its parts will automatically adjust themselves to the wear thereof, and generally, to provide a packing ring which will be faultless, can be easily applied, readily removed or replaced, inexpensive in construction, strong, durable and economical in regard to maintenance. Other objects, advantages and desirable features of the invention will be disclosed in the subjoined description and explanation.

In the accompanying drawing which serves to illustrate an embodiment of the invention, Figure 1, is a plan view of the composite ring showing the parts thereof in about the positions they will occupy when the ring is seated for operation on a piston when in a cylinder.

Fig. 2, is a greatly enlarged sectional view taken on line 2, 2, of Fig. 1, looking in the direction indicated by the arrows showing the ring shortened for the convenience of illustration and the relative position of its parts with respect to the external wall of the piston which is indicated by dotted lines.

Fig. 3, is a similar view of a part of the ring showing about the position of the parts which they will assume when assembled on the piston and before being placed in the cylinder, and Fig. 4, is a similar view to that shown in Fig. 3 but illustrating a modification in the construction of the ring.

Like reference numerals refer to like parts throughout the different views of the drawings.

The composite packing ring is designated, as a whole, by the numeral 5, and is shown in Fig. 1, of the drawing, with its parts assembled but detached from the piston and cylinder. The piston 6 is provided with a circumferential recess or groove 7 on its exterior and near one of the ends thereof in which the packing ring is seated. This recess or groove is angular in cross-section and has its end adjacent to the end of the piston closed by a flange or plate 8 mounted on the piston, which flange is of the same size in circumference as the external wall of the latter. The inner surface 9 of the flange 8 is disposed in parallelism with the opposite wall 10 of the groove 7, and at a right angle to the vertical or inner wall thereof as is clearly shown in Fig. 3 of the drawing, thus giving a rectangular form in cross-section to the groove 7 of the piston. This flange may be secured to the piston 6 by means of screws 11, as shown, or it may be formed integrally with the piston as is obvious.

Located in the groove 7 around, yet spaced a slight distance from the vertical or longitudinal wall 12 thereof, is an expansible ring or member 13 of the packing, which will be hereinafter called the expander or inner ring. As shown in Fig. 1 of the drawing this ring is split or broken and has its ends 14 slightly separated. It will also be observed by reference to said figure that it is eccentrically tapered toward its ends for the purpose of affording uniformity of action and augmenting its resiliency and that its thickest portion is located diametrically opposite the space between the ends of said ring. By reference to Figs. 2 and 3 of the drawing it will be seen and understood that the expander ring 13 has outwardly inclined faces 15 each of which is provided with a pair of steps or shoulders 16 against which the steps or shoulders 17 on the inner surfaces of the intermediate rings 18 will rest under certain conditions, to the end, that said intermediate rings, as well as, the outer rings 19 will be more positively forced into intimate contact at their outer faces with the inner wall of the cylinder. By providing the inclined outer faces 15 of the spring expander ring 13 with the steps or shoulders 16 the area of said outer faces will be increased and the said ring will be made more resilient than if said faces were in unbroken inclines. Each of the intermediate rings 18 is split, as shown, and have their ends 20 spaced apart and located at points about diametrically opposite the space between the ends 14 of the expander ring upon the opposite sides of which they are located, all of which is clearly shown in Figs. 1 and 2 of the drawing. Each of the rings 18 has its outer face outwardly inclined as at 21, and provided at the inner edge of said inclined face with a step or shoulder 22 to rest against the shoulders 23 on the outer split rings 19, one of which is located on each of the intermediate rings. Each of the outer rings 19 is substantially triangular in cross-section as shown, and has its face adjacent to the ring 18 on which it is mounted of corresponding shape to that of the adjacent face of said intermediate ring and its outer face of a shape to correspond with the shape of the inner surface of the cylinder against which it is adapted to contact.

The ends 24 of each of the outer rings 19 are spaced apart and are located so that the space therebetween will coincide or register with the space between the ends 14 of the expander ring (see Fig. 1 of the drawing).

Each of the intermediate rings 18 is provided at a point about diametrically opposite the space between its ends with a pin 25 which projects from each of the faces of the ring in which it is located so that its ends will extend between the ends 14 of the expander ring and the ends 24 of the outer ring located on said intermediate ring. By this arrangement it is evident that as the intermediate rings are interposed between the outer rings 19 and the expander ring 13 in such a way that their unbroken surfaces will lie between the space between the ends of the expander ring and the space between the ends of the outer rings in which position they will be maintained by the projections 25, the passage of fluid will be absolutely prevented. The pins or projections 25 on the intermediate rings being extended into the space between the ends of the expander ring and the spaces between the ends of the outer rings will prevent the circumferential movement of said rings with respect to one another to any great extent as is manifest. The several rings of the composite or packing ring are of sufficient size that when they are contracted so that their ends will meet the inner or expander ring will be located at a slight distance from the inner wall of the groove 7 of the piston. The spring can be sprung into place in the groove of the piston, or if a removable flange 8 is employed, they can be slipped over the ends of the piston before said flange is secured in place.

In Fig. 4 of the drawing is shown a modification in the construction of the ring which consists in employing an expander ring 13ª having a single outwardly inclined face 15 instead of two outwardly inclined faces as in the other construction. This single face is provided with steps 17 as in the other construction. The other features or elements of the modified form now under consideration are of the same construction and arrangement as that first above described except that only one of the intermediate rings and one of the outer rings is employed. This modification will be found very useful in small engines or motors.

Having thus fully described my invention, what I claim as new and desire to secure by Letters Patent, is—

1. The combination with a piston having an annular groove, of a split inner spring expander ring located in said groove and having an outer inclined face and its ends spaced apart, the inclined face being stepped to provide offset parallel surfaces, a split intermediate ring having its inner face inclined and stepped coincident to the expander ring and fitting against the inclined face of the expander ring and its outer face inclined and stepped, a split outer ring substantially triangular in cross-section and having its inner surface inclined and fitting against the outer surface of the intermediate ring, and a transversely disposed projection on each of the faces of the intermediate ring, one of said projections being located between the ends of the outer ring and the other between the ends of the expander ring.

2. The combination with a piston having an annular groove, of a split inner spring expander ring located in said groove and having an outer inclined face and its ends spaced apart, the inclined face being stepped to provide offset parallel surfaces, said ring being eccentrically tapered toward its ends, a split intermediate ring having its inner face inclined and stepped coincident to the expander ring and fitting against the inclined face of the expander ring and its outer face inclined and stepped, a split outer ring substantially triangular in cross-section and having its inner surface inclined and fitting against the outer surface of the intermediate ring, and a transversely disposed projection on each of the faces of the intermediate ring, one of said projections being located between the ends of the outer ring and the other between the ends of the expander ring.

3. The combination with a piston having an annular groove, of a split inner spring expander ring located in said groove and having outer inclined faces offset and in parallelism, a split intermediate ring having its inner face inclined and stepped and fitting against each of the inclined faces of the expander ring, each of said intermediate rings having its outer face inclined and stepped, a split outer ring substantially triangular in cross-section and having its inner surface inclined and fitting against the outer surface of each of the intermediate rings, and a transversely disposed projection on each of the faces of each of the intermediate rings, the projections on the inner faces of the intermediate rings being located between the ends of the expander ring and the projections on the outer surface of each of the intermediate rings being located between the ends of the outer rings.

4. The combination with a piston having an annular groove, of a split inner spring expander ring located in said groove and having outer inclined faces offset and in parallelism, said ring being eccentrically tapered toward its ends, a split intermediate ring having its inner face inclined and stepped and fitting against each of the inclined faces of the expander ring, each of said intermediate rings having its outer face inclined and stepped, a split outer ring substantially triangular in cross-section and having its inner surface inclined and fitting against the outer surface of each of the intermediate rings, and a transversely disposed projection on each of the faces of each of the intermediate rings, the projections on the inner faces of the intermediate rings being located between the ends of the expander ring and the projections on the outer surface of each of the intermediate rings being located between the ends of the outer rings.

5. A packing ring, consisting of a split inner spring expander ring adapted for location circumferentially on a cylindrical piston, said ring having inclined faces offset and in parallelism, a split intermediate ring having its inner face inclined and stepped and fitting against each of the inclined faces of the expander ring, each of said intermediate rings having its outer face inclined and stepped, a split outer ring substantially triangular in cross-section and having its inner surface inclined and fitting against the outer surface of each of the intermediate rings, and a transversely disposed projection mounted on each of the intermediate rings and extended from each of the faces thereof, the projections on the inner faces of the intermediate rings being located between the ends of the expander ring and the projections on the outer surface of each of the intermediate rings being located between the ends of the outer rings.

JOHN F. KYTLICA.

Witnesses:
   CHAS. C. TILLMAN,
   CECILIA C. CASEY.